Jan. 31, 1939.    S. TRACHTENBERG    2,145,326
SHAVING DEVICE
Filed Aug. 23, 1937    2 Sheets-Sheet 1

INVENTOR.
Samuel Trachtenberg

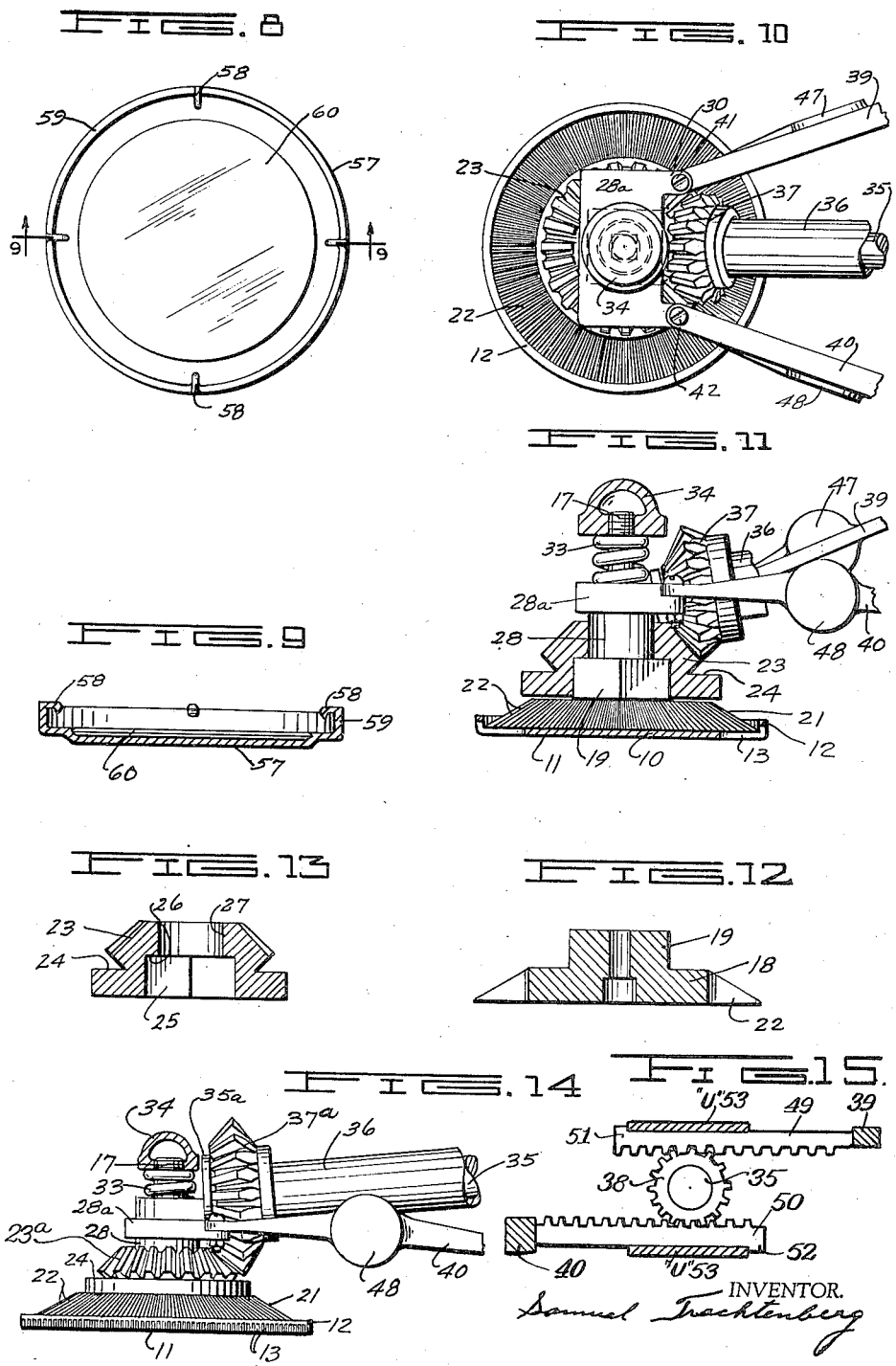

Patented Jan. 31, 1939

2,145,326

UNITED STATES PATENT OFFICE 2,145,326

SHAVING DEVICE

Samuel Trachtenberg, Cleveland, Ohio

Application August 23, 1937, Serial No. 160,393

5 Claims. (Cl. 30—43)

My invention relates to shaving devices and in particular to an improved form of the shaving device specified and illustrated in my previous application Serial No. 148,047, filed June 14, 1937.

The objects in this application being primarily the same as those in the previous application except that this device may be more readily carried upon the person and has a mirror cover for greater convenience.

The improvements particularly concerned in the present invention are its compact form and its rotary action characterized by the fact that the rotary cutting tool rotates on top of the stationary cutting tool by gear action.

These and other objects may be readily seen from the following specification and its accompanying illustrations, in which:

Fig. 8 is a plan view of the mirrored cover.

Fig. 9 is a section on line 9—9 of Fig. 8.

Fig. 10 is a fragmentary top plan view of Fig. 6.

Fig. 11 is a sectional view of Fig. 10.

Fig. 12 is a sectional view of the rotating cutting tool.

Fig. 13 is a sectional view of the gear.

Fig. 14 is a modified form of the device with the gears reversed for faster rotation of the rotating cutting gear and tool.

Fig. 15 is a diagrammatic enlarged view of the racks, stops and U clamp showing the meshing of the racks with the spur gear as indicated in Fig. 1.

Figure 1:
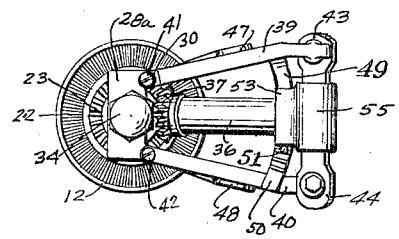
Fig. 1 is a top plan view of the device in its inactive or expanded position.
Figure 2:
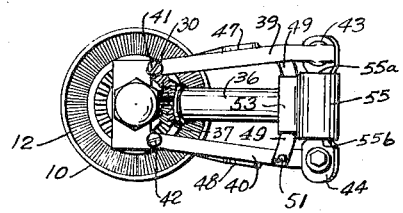
Fig. 2 is a view similar to Fig. 1 except that it is in its active or compressed position.
Figure 3:
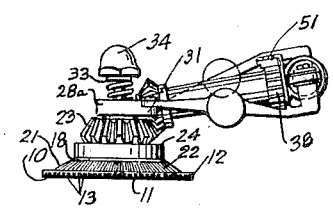
Fig. 3 is a side elevation of Fig. 1.
Figure 4:
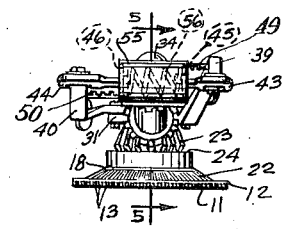
Fig. 4 is a rear elevation of Fig. 1.
Figure 5:
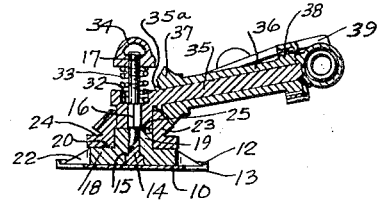
Fig. 5 is a section on line 5—5 of Fig. 4.
Figure 7:
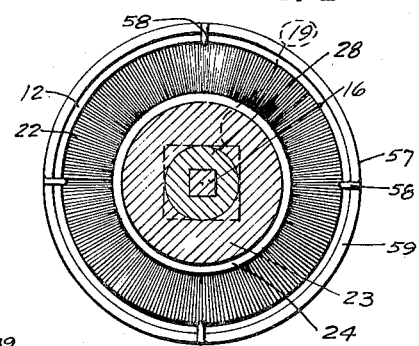
Fig. 7 is a section on line 7—7 of Fig. 6.
Figure 6:
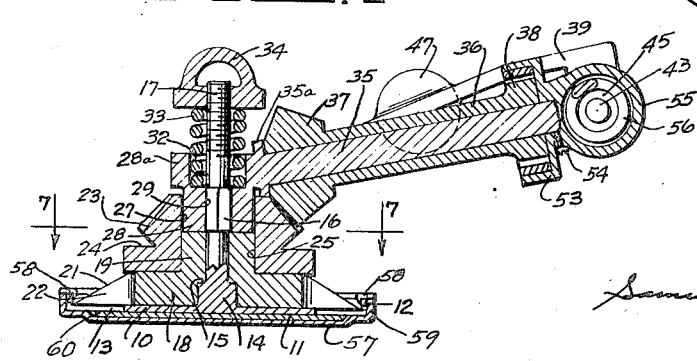
Fig. 6 is an enlarged section similar to Fig. 5 except that a cover with inside mirrored surface is shown clamped over the stationary cutting tool.

Again referring to the illustrations, the circular stationary cutting tool 10 has a flat bottom surface 11 and terminates in an upturned flange 12 around its outer periphery. A plurality of fine slots 13 radiate outwardly to the periphery of the said cutting tool 10 and upward slightly on the flange 12 as specifically illustrated in Figs. 2 and 3.

A post 14, projecting upwardly from the center of the top surface of the stationary cutting tool 10, is shouldered at 15 and has a square center portion 16, the top portion 17 being threaded.

A rotatable cutting tool 18 is also circular in contour and is mounted over the center post 14 of the circular stationary cutting tool 10, a collar 19 having a square outline projects upwardly from the center of the top surface 20, of the said rotatable cutting tool 18, the edges 21 of the said cutting tool tapering downward and outward to the inner wall of the flange 12 of the stationary cutting tool 10, said tapered edges having a plurality of slots 22 radiating outwardly from the top surface 20 at the beginning of the taper.

A gear 23, of the bevel type, shouldered at 24 has a square aperture 25 in the center of its lower portion, said aperture being shouldered at 26 and terminating in a round bore 27 in the center of the top portion, said gear is mounted over the square collar 19 of the circular rotatable cutting tool 18, the square aperture 25 receiving the square collar 19.

A cylindrical shaft 28 is mounted over the square center portion 16 of the post 14, a square aperture 29 in the shaft 28 receiving the square portion 16 of said post.

Flanged angular arms 30 and 31 project outwardly from the elongated top portion 28a of the cylindrical shaft 28 at opposed sides of said shaft, a recess 32 therein seats a spring 33 mounted over the threaded end 17 of the post 14, a threaded cap 34 being screwed down thereon to secure the proper tension necessary for the stationary and rotary cutting tools 10 and 18 respectively, to function properly.

An integral part of the top portion 28a of the shaft 28 is an angularly disposed axle 35 over which is mounted a double gear shaft 36 having a pinion gear 37 at its inner end and a spur gear 38 at its outer end. The pinion gear being positioned by a shouldered portion 35a of the axle 35 so that the teeth of said pinion gear 37 are in constant mesh with the teeth of the bevel gear 23.

A pair of operating arms 39 and 40 are pivotally secured by one end to the flanged angular arms 30 and 31 respectively of the elongated top portion 28a of the cylindrical shaft 28, the operating arm 39 being secured to the bottom surface of the angular arm 30 by a pivot pin 41 while the operating arm 40 is secured to the top surface of the angular arm 31 by a pivot pin 42.

At the opposed angularly disposed ends of the operating arms 39 and 40 are secured plungers 43 and 44 respectively, said plungers having circular discs 45 and 46 respectively mounted over the ends of the plungers and forming an integral part thereof.

Thumb and finger discs 47 and 48 formed at the outer sides of the operating arms 39 and 40 are substantially in the middle thereof.

Forward from and adjacent the plungers 43 and 44 are gear racks 49 and 50 secured to the top and bottom of the operating arms 39 and 40 respectively and projecting inwardly therefrom, both engaging the spur gear simultaneously upon opposed sides thereof.

A pair of stops 51 and 52 on the extreme outer ends of the racks 49 and 50 prevent said racks from slipping from their meshed position with the spur gear 38 when a U clamp is mounted over and under the center of said racks and secured to the axle 35 by a set screw 54.

The U clamp 53 has a cylindrical portion 55 projecting rearwardly therefrom having both ends 55a and 55b open, plunger discs 45 and 46 being mounted therein with a compression spring 56 therebetween within the cylinder.

In operation, the constant action created by the pressing and releasing of the operator's thumb and finger on the discs 47 and 48 on the operating arms 39 and 40, cause the plunger discs 45 and 46 to compress the spring 56 within the cylinder 55, and the gear racks 49 and 50 to move back and forth on the top and bottom of the spur gear 38 which rotates the double gear shaft 36 on the axle 35, the pinion gear 37 meshing with the bevel gear 23 which in turn rotates the top circular cutting tool 18 within the flanged portion 11 of the stationary cutting tool 10, the slots 22 of the tapered portion 21 of the rotating cutting tool 18 moving across the slots 13 in the said stationary cutting tool permitting a close, clean shave either with or without an application of soap or shaving cream. This type of construction permits the movement of the shaving device in any direction across the surface of the skin for a quick shave.

An acceleration of the rotating action of the rotatable cutting tool 18 may be obtained by having a smaller bevel gear 23a and a larger pinion gear 37a, as illustrated in Fig. 14.

A cover 57 having a plurality of spring clips 58 around its flanged outer periphery 59 projecting inwardly and has mounted in the center of its inner surface, a mirror 60, (or a mirrored surface may be used) said cover is pressed over the bottom surface 11 of the stationary cutting tool 10, the spring clips 58 snapping over the flanged edge 12 of said cutting tool to hold the cover 57 in place. This cover serves as a protection for the clothes when the shaving device is carried on the person and it also makes a compact and convenient shaving device.

It is believed that the forging description will sufficiently explain the plan of construction of my improved form of shaving device as well as the mode of operation of the same; while I have described these improvements and advantages with considerable detail I do not wish to confine the invention or the protection sought to the precise construction shown but deem that such protection shall extend to the full limits and scope of the appended claims. Having thus described my invention, what I claim, is;

1. A shaving device comprising a circular stationary cutting tool having a center post, a flange around the periphery thereof and slots radiating outwardly therethrough, a circular rotatable cutting tool mounted on said post having teeth radiating outwardly within the flanged periphery of the circular stationary cutting tool and rotating thereover, a square collar projecting upward from the center of the rotatable cutting tool and a bevel gear having a square aperture terminating in a round bore therethrough mounted over the square collar and activating means whereby the bevel gear is motivated.

2. A shaving device comprising a circular stationary cutting tool having a center post with a square center portion and a threaded top portion, a circular rotatable cutting tool having a square collar mounted over said post, a bevel gear having a square aperture terminating in a round bore, the square aperture registering with the square collar of the rotatable cutting tool, a cylindrical shaft mounted within the round bore upon the square portion of the post and an elongated top portion of the cylindrical shaft having a recess in the center thereof, a spring seated in the recess over the round threaded portion of the post and a threaded adjustment cap screwed upon the post to regulate the tension between the circular stationary cutting tool and the circular rotatable cutting tool.

3. A shaving device comprising a circular stationary cutting tool having a round center post with a square center portion, a rotatable cutting tool mounted thereover having a square collar, a bevel gear mounted over the collar and having a square aperture terminating in a round bore therethrough, a cylindrical shaft having an elongated top portion mounted within the round bore and over the square center portion of the post, an angularly disposed axle projecting from the elongated top portion of the cylindrical shaft and a double gear shaft mounted thereover having a pinion gear at its inner end meshing with the bevel gear and a spur gear at its outer end and means to activate the gears.

4. A shaving device as in claim 3, a pair of operating arms pivotally secured to the opposed ends of the elongated top portion, thumb and finger discs positioned on the outside of said arms, and plungers secured to the ends of the arms and projecting inwardly therefrom, a U clamp having a cylindrical portion extending rearwardly with a spring mounted therein in juxtaposition with said plungers to enable the operator to compress the spring between the plunger discs within the cylinder when the thumb and finger discs are pressed inwardly.

5. A shaving device comprising, a pair of circular cutting tools, one stationary and one rotatable, a bevel gear on said rotatable cutting tool, a cylinder shaft within said gear having an elongated top portion, and operating arms pivotally secured to said elongated top portion at its opposed ends, thumb and finger discs on said arms and gear racks secured to the arms and inwardly disposed therefrom, said arms and racks being on different planes on opposed sides, an axle angularly disposed from the elongated top portion of, the cylinder shaft and a double gear shaft mounted thereon having a pinion gear on its inner end meshing with the bevel gear and a spur gear on its outer end meshing with the gear racks, a U clamp mounted over the gear racks and spur gear and a set screw which secures the U clamp to the axle, a cylinder extending rearwardly from the U clamp has a spring mounted therein, a pair of plungers secured to the ends of the operating arms and mounted within the opposite ends of the cylinder activated by the moving operating arms.

SAMUEL TRACHTENBERG.